United States Patent
Pazos

(10) Patent No.: US 7,315,515 B2
(45) Date of Patent: Jan. 1, 2008

(54) TCP ACCELERATION SYSTEM

(75) Inventor: Carlos M. D. Pazos, La Jolla, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 827 days.

(21) Appl. No.: 10/676,900

(22) Filed: Sep. 30, 2003

(65) Prior Publication Data

US 2005/0068896 A1  Mar. 31, 2005

(51) Int. Cl.
- *G01R 31/08* (2006.01)
- *H04L 12/28* (2006.01)
- *H04L 12/66* (2006.01)

(52) U.S. Cl. ............ 370/231; 370/278; 370/412; 370/394; 370/352

(58) Field of Classification Search ........... 370/230, 370/230.1, 236, 235, 252, 468, 352, 394, 370/278, 412; 375/240, 260
See application file for complete search history.

(56) References Cited

U.S. PATENT DOCUMENTS

| | | | |
|---|---|---|---|
| 5,793,768 A | | 8/1998 | Keshav |
| 6,078,564 A | * | 6/2000 | Lakshman et al. .......... 370/235 |
| 6,424,626 B1 | * | 7/2002 | Kidambi et al. ............ 370/236 |
| 6,680,906 B1 | * | 1/2004 | Nguyen ...................... 370/229 |
| 6,741,555 B1 | * | 5/2004 | Li et al. ..................... 370/229 |
| 6,741,563 B2 | * | 5/2004 | Packer ....................... 370/231 |

OTHER PUBLICATIONS

Balakrishnan et al.; "TCP Performance Implications of Network Path Asymmetry"; Network Working Group Request for Comments: 3449; Dec. 2002; pp. 1-41.

Border et al.; "Performance Enhancing Proxies Intended to Mitigate Link-Related Degradations"; Network Working Group Request for Comments: 3135; Jun. 2001; pp. 1-45.

Allman et al.; "TCP Congestion Control"; Network Working Group Request for Comments: 2581; Apr. 1999; pp. 1-14.

Balakrishnan et al.; "The Effects of Asymmetry on TCP Performance"; ACM Mobile Networks and Applications (MONET); vol. 4, No. 3; 1999; pp. 219-241.

Fairhurst et al.; "Performance Issues in Asymmetric TCP Service Provision using Broadband Satellite"; IEE Proceedings on Communication; Apr. 2001; vol. 148, No. 2; pp. 95-99.

Samaraweera; "Return Link Optimization for Internet Service Provision Using DVB-S Networks"; ACM Computer Communications Review (CCR); vol. 29, No. 3; 1999; pp. 4-19.

Balakrishnan et al.; "The Effects of Asymmetry on TCP Performance"; Proc. 3rd ACM/IEEE Intl. Conference on Mobile Computing and Networking (MobiCom); Budapest, Hungary; Sep. 1997; pp. 1-13.

(Continued)

*Primary Examiner*—Hanh Nguyen
(74) *Attorney, Agent, or Firm*—Hogan & Hartson LLP

(57) ABSTRACT

A system and method for transmission control protocol (TCP) acceleration. Incoming acknowledgement (ACK) packets belonging to a TCP session are received, and an upstream queue is searched for queued acknowledgment packets belonging to the same TCP session. If the incoming acknowledgment packet is not a duplicate of the queued acknowledgment packet, one of the queued acknowledgment packets is replaced with the incoming acknowledgment packet in the position in the upstream queue occupied by the oldest of the queued acknowledgment packets. After the oldest queued acknowledgement packet is replaced, remaining acknowledgement packets in the queue are dropped.

10 Claims, 3 Drawing Sheets

OTHER PUBLICATIONS

Durst et al.; "TCP Extensions for Space Communications"; ACM/IEEE Mobile Communications Conference (MobiCom); New York, USA; Nov. 1996; pp. 15-26.

Auge et al.; "Window Prediction Mechanism for Improving TCP in Wireless Asymmetric Links"; IEEE; 1998; pp. 533-538.

Samaraweera, et al.; "High Speed Internet Access Using Satellite-Based DVB Networks"; Proc. IEEE International Networks Conference (INC98); Plymouth, UK; 1998; pp. 23-28.

Ming-Chit et al.; "Improving TCP Performance Over Asymmetric Networks"; ACM SIGCOMM, ACM Computer Communications Review (CCR); vol. 30, No. 3; 2000.

* cited by examiner

TCP ACCELERATION SYSTEM

FIELD OF THE INVENTION

The present invention relates to transmission control protocol performance problems that arise because of bandwidth asymmetry effects and, in particular, relates to a method for selective discarding of ACK packets from the lowest bandwidth channel queue.

BACKGROUND OF THE INVENTION

Data Over Cable Service Interface Specification (DOCSIS) cable modem devices allow fast, and usually bandwidth asymmetrical, access to the Internet, where the available downstream (DS) bandwidth tends to be larger than the upstream (US) bandwidth. This bandwidth asymmetry is reasonable for most applications, since the bulk of transferred bytes tends to be carried in the DS direction rather than the US direction. This is particularly the case for popular applications using the Transmission Control Protocol (TCP), such as file downloads via the File Transfer Protocol (FTP) and web browsing through the Hypertext Transport Protocol (HTTP). In these applications, an Internet server sends more and larger TCP packets to a client (in the DS direction) than the client sends to the server (in the US direction).

While it is true that the bulk of data is carried in the DS direction, the performance (speed) of the DS channel is nevertheless constricted by the performance of the US channel. In order to guarantee that each data packet sent by a source reaches its destination, TCP applications utilize a reliability mechanism in which the destination client explicitly acknowledges successful reception of data packets from a source by sending ACK packets back to the source. Typically, a server sends several data packets at a time to a client and then waits to receive ACK packets from the client acknowledging receipt of the data packets. If the server does not receive ACK packets from the client within a certain time, the server determines that the data packets were not successfully delivered to the client, stalls the transmission of further new data packets, and retransmits the unacknowledged packets until it receives ACK packets from the client acknowledging their receipt.

An ACK indicates to the server that all previous packets have been properly received by the client. This is accomplished by the use of sequence numbers. Each byte the source sends to the destination is individually numbered according to the sequence in which those bytes are to be delivered. A forward packet (sent in the DS direction from source to destination) includes in its TCP header the position (sequence number) that the first byte in the packet payload (data) occupies in the overall data stream. An ACK packet (sent in the US direction from destination to source) includes in an ACK number field the sequence number of next byte expected, the last byte in the sequence that was correctly received plus one.

Hence, in a very simplified scenario for purposes of illustration, where one six-byte packet is sent at a time and each packet is ACK'd by the destination, a forward packet including bytes numbered 1-6 would include the sequence number 1 in is header to indicate the position that the first byte in the packet occupies in the data stream. Upon receiving this forward packet, the destination would transmit an ACK in the US direction including the number 7 in its ACK number field to indicate the last byte in the sequence that was correctly received and the next byte expected. Upon receiving this ACK, the source is able to confirm that the destination has received all bytes up to byte number 6 and is ready to receive new bytes beginning with byte number 7. Hence, it may send a forward packet with the sequence number 7 in its header and containing bytes 7-12, and then wait for reception of an ACK with sequence number 13.

As one might imagine, actual implementation is significantly more complex than this simplified scenario. A source typically sends several packets at a time, and ACKs sent by the destination may cover more than one packet. As successive ACK packets arrive at the source, the source may increase the number of packets that are sent at a time. TCP uses a window flow control mechanism in which the source and destination entities maintain a valid range, or window, of sequence numbers that can be exchanged at a certain point of time. The width of the sequence number range determines the window size and the number of data and ACK packets that can be in transit between the source and destination at a given time.

Hence, in actual implementations, multiple packets will typically be in transit in the DS direction from source to destination. Since these packets may take different paths in the source-destination path, they may arrive at the destination out-of-order. Some packets may also be lost. A TCP receiver issues a duplicate ACK whenever an out-of-order segment arrives. Hence, all packets received after a lost packet will trigger duplicate ACKs. If packets are not lost, but are simply received out-of-order, some duplicate ACKs will result. The destination saves these out of order packets, which gives rise to gaps in the stream of sequence numbers received. When eventually an in-order packet fills a gap, the destination will send a new ACK (containing the sequence number that indicates receipt of all the in-order packets received, with no gaps till that sequence number).

When the US channel becomes clogged with traffic, ACKs begin to accumulate in a queue at the cable modem. Many of the ACKs may be duplicate ACKs, as described above. Some of these duplicate ACKs may be important, for instance, to indicate to the source that a packet with a higher sequence number has not yet been received. Conversely, some of the duplicate ACKs may not be important. When a packet with the next sequence number has arrived, for instance, and an ACK indicating such has been generated but is in the queue behind duplicate ACKs that were generated before the next packet's arrival, the duplicate ACKs no longer convey important information to the source since the next data packet has actually arrived.

Additionally, some of the ACKs may be redundant relative to other ACKs in the queue. For a byte sequence having sequence numbers 1-20, for example, an ACK containing sequence number 12 is rendered redundant by a subsequent ACK containing sequence number 18. The ACK with sequence number 18 indicates that all bytes up to number 17 have been received; hence, the ACK with sequence number 12 indicating that all bytes up to number 11 have been received is no longer necessary in view of the subsequent ACK.

As previously described, when the DS channel carries much more data than the US channel, and much more bandwidth is available to the DS channel than is available to the US channel, the US channel queue may become clogged and transmission of ACKs from destination to source is delayed. Since the source must wait for arrival of the appropriate ACKs before sending out new data packets, delays in the US channel are tied to and negatively impact DS channel speed performance.

ACK "filtering" has been proposed to remove excess ACKs from the US queue and thereby improve US and overall TCP performance. However, not all duplicate ACKs can simply be dropped; some convey important information to the source. Additionally, while some redundant ACKs may be safely dropped, excessive dropping of redundant ACKs can lead to excessive burstiness at the source. That is, if too many redundant ACKs are removed from the queue, a "stretch ACK" may result indicating receipt of a large number of packets at once, and leading to a "bursty" transmission of a large number of new packets at once by the source. The loss of these "stretch ACKs" can also adversely affect performance. Finally, some ACKs contain important control information and possibly even data, and these ACKs cannot safely be dropped either.

While the prior art has recognized the desirability of ACK filtering, there has been no proposal to date on how or when to carefully discard duplicate ACKs from the US channel, on how to handle those ACKs containing SACK and ECN information, and how to track the number of ACKs discarded or to what level should the ACK discarding be limited in order not to cause excessive burstiness at the source.

SUMMARY OF THE INVENTION

One embodiment of the invention is a method for transmission control protocol (TCP) acceleration. The method comprises the steps of receiving an incoming acknowledgement packet belonging to a TCP session, and searching an upstream queue for queued acknowledgment packets belonging to the same TCP session. If the incoming acknowledgment packet is not a duplicate of the queued acknowledgment packet, one of the queued acknowledgment packets is replaced with the incoming acknowledgment packet in the position in the upstream queue occupied by the oldest of the queued acknowledgment packets.

Another embodiment of the invention is a system for TCP acceleration. The system includes an upstream queue for queuing packets, including TCP acknowledgment packets, and a means for receiving incoming acknowledgement packets belonging to a TCP session. The system also includes means for searching an upstream queue for queued acknowledgment packets belonging to the same TCP session, and means for replacing one of the queued acknowledgment packets with the incoming acknowledgment packet in the position in the upstream queue occupied by the oldest of the queued acknowledgment packets if the incoming acknowledgment packet is not a duplicate of the queued acknowledgment packet.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION OF THE INVENTION

Figure 1:
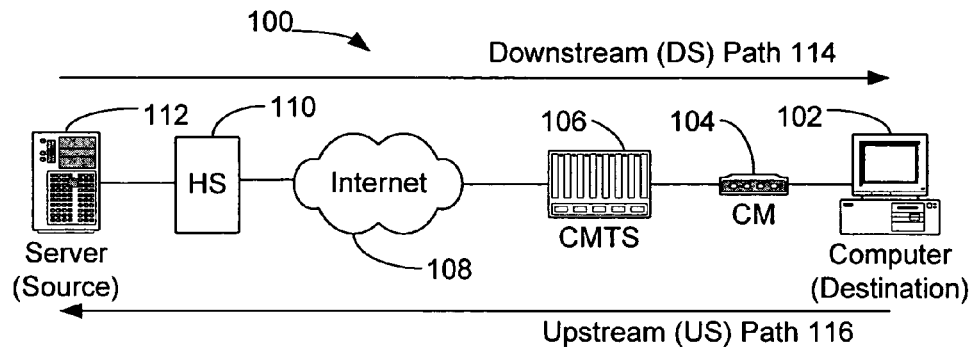
FIG. 1 is a diagram of an exemplary network system in which the present invention may be implemented as part of the cable modem (CM) device.

FIG. 1 depicts an example network system 100 in which the present invention may be implemented as part of the cable modem (CM) device. System 100 includes, on the client side, a computer (the client) 102 attached to a cable modem device 104 coupled to the Internet 108 via a Cable Modem Termination System (CMTS) device using the DOCSIS interface 106. On the source or server side, the server 112 is coupled to the Internet 108 via any of a number of possible high-speed (HS) interfaces 110 (e.g., 100 MB Ethernet, T3 or OC-3 leased lines, etc.) immaterial to the invention. The communications path from source-to-destination is referred to as the downstream (DS) path 114, and the reverse communications path from destination-to-source is referred to as the upstream (US) path 116. It should be understood that the scenario presented in FIG. 1 is just one example of a system in which the present invention may be implemented, and that the present invention has utility in any TCP communication over a path where improved performance and efficiency to compensate for bandwidth asymmetry in the path is desired. In these cases the invention can be implemented as part of the device with a bandwidth asymmetric interface.

In the case of a cable modem 104 that provides fast, and usually asymmetrical, access to Internet 108 utilizing the Internet Protocol (IP) suit of protocols such as the Transmission Control Protocol (TCP), the downstream (DS) bandwidth is typically much greater than the upstream (US) bandwidth. This bandwidth asymmetry leads the DS performance for TCP transfers to be constricted by US performance. A significant factor in US performance is the US transmission of ACK packets to acknowledge receipt of data packets. The present invention extends on a Performance Enhancing Proxy (PEP) technique known as ACK-filtering that improves the DS performance of bandwidth asymmetric devices such as a cable modem 104 for TCP DS data traffic by carefully discarding ACK packets congesting the US channel. ACK packets queued for US transmission are inspected and chosen for discarding in a manner so as not to stall the sender (starve the sender of ACKs) or delete ACKs that convey important data or control information or are used for special functions.

Figure 3:
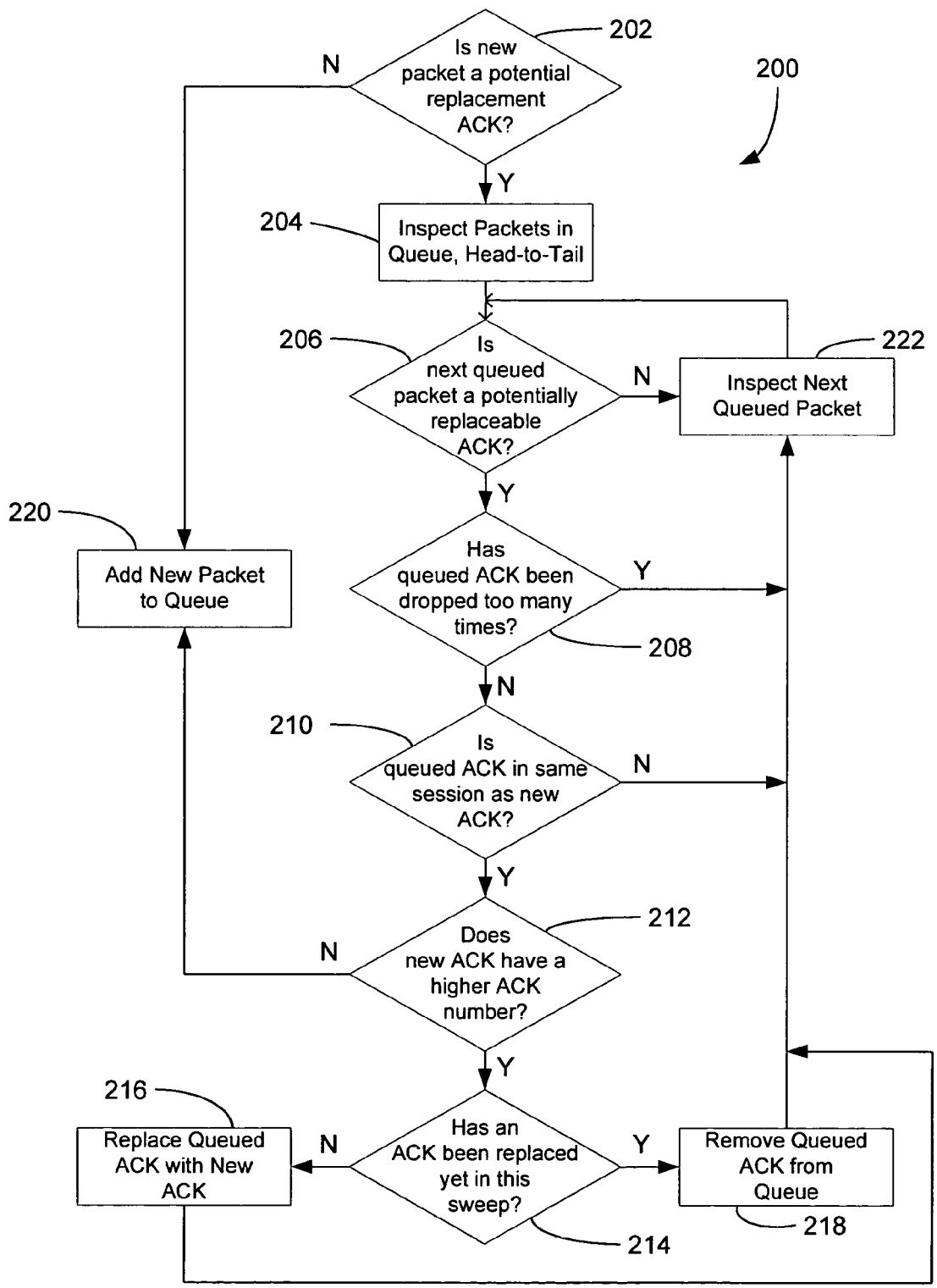
FIG. 3 is a flow chart illustrating a method for ACK discarding according to the present invention.
Figure 4:
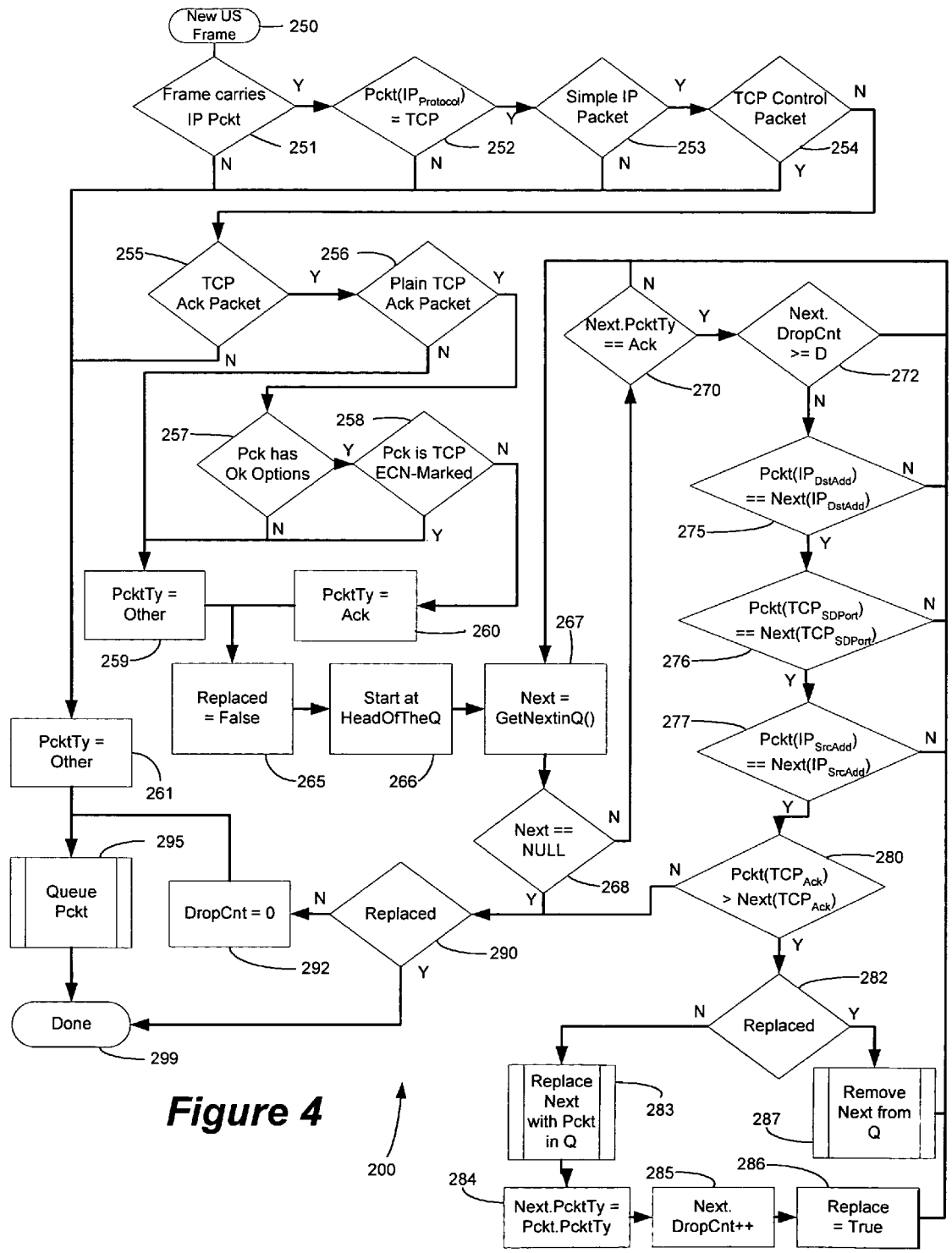
FIG. 4 is a flow chart illustrating the method of FIG. 3 in greater detail.

FIG. 3 is a flow chart setting forth a method 200 for ACK discarding according to the present invention. FIG. 4 is a flow chart illustrating method 200 in greater detail. Preferably, method 200 is implemented as software or hardware in a device with bandwidth asymmetric interface such as cable modem 104 in FIG. 1. In one implementation, the cable modem 104 is a DOCSIS cable modem and the present invention is implemented as part of the DOCSIS software on a chip in cable modem 104.

Figure 2:
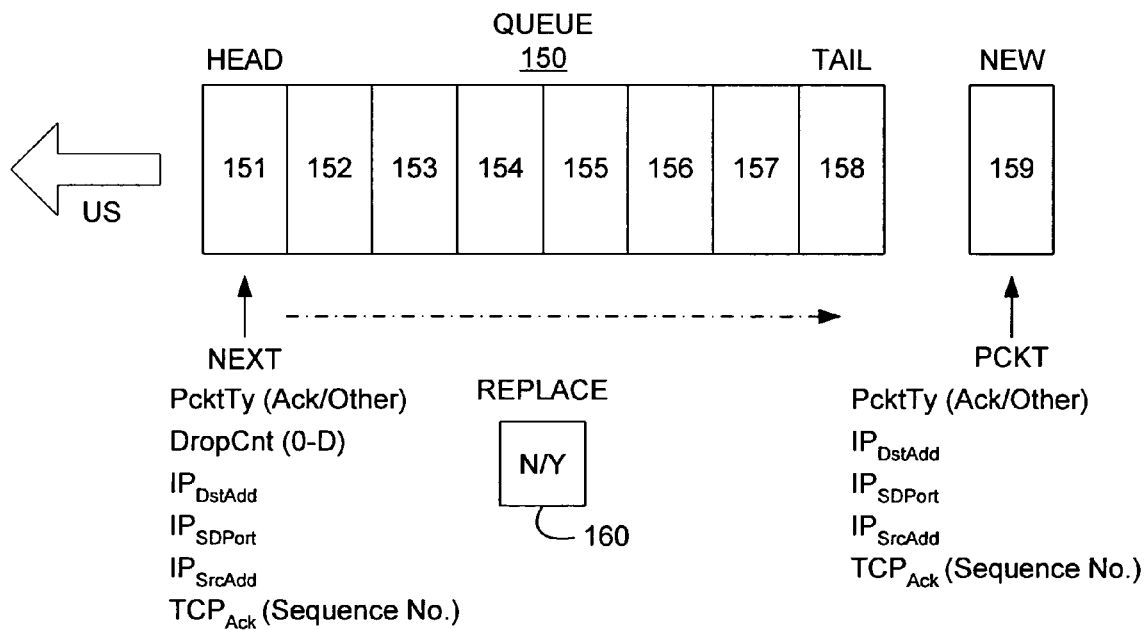
FIG. 2 is a diagram of a simplified queue and a new packet arriving at the queue for upstream transmission.

The description of ACK-filtering method 200 assumes a simplified queue, such as queue 150 illustrated in FIG. 2. Queue 150, as depicted, is a buffer or other suitable memory construct having a particular number of slots for storing packets awaiting for upstream transmission. Queue 150, as depicted, has eight spaces or slots 151-158 for storing packets; it should be understood, of course, that the particular number of slots in the queue may vary and has no bearing on the present invention. Slot 151 is the "head" of the queue and the packet stored there is the next packet to be transmitted upstream. Slot 158 is the "tail" of the queue and is the slot where a new packet 159 to be added to the queue will be placed (assuming that packet 159 does not replace a packet elsewhere in the queue, per method 200). Queue 150 preferably operates as a FIFO (first in, first out) buffer, with the newest packets being placed at the tail and gradually making their way to the head for upstream transmission.

Referring to FIG. 3, each new packet received for US transmission (e.g., a packet 159 as shown in FIG. 2) is examined to determine whether it is an ACK packet, and whether it is a candidate for replacing another ACK packet that is currently queued for US transmission (step 202). As will be described in more detail with reference to FIG. 4, this depends on whether the packet is a TCP ACK packet and, if so, the control information, options settings and any data carried with the ACK (some ACK packets can replace another ACK packet but may not be dropped themselves). If the new packet is not a potential replacement ACK, it is added to the tail of the queue (step 220).

If the new packet is a potential replacement ACK, in step 204, the packets already queued for US transmission are inspected, from the head of the queue (oldest queued packet) to the tail of the queue (newest queued packet). With reference to queue 150 of FIG. 2, if packet 159 has been determined to be a potential replacement ACK, the packets held in queue 150 are inspected beginning with the packet in the head position 151 and ending with the packet in the tail position 158.

In step 206, a determination is made as to whether the queued packet is a potentially replaceable ACK. Again, this determination depends on the control setting, options data and data carried by the packet and will be described in more detail with respect to FIG. 4. If the packet is not a potentially replaceable ACK, the method moves on to inspect the next queued packet (step 222). Hence, in FIG. 2, the "NEXT" arrow would move from packet 151 to packet 152, and packet 152 would then be inspected.

If the queued packet is a potentially replaceable ACK, in step 208, a determination is made as to whether the ACK in that position has been dropped (replaced) too many times. It is desirable to maintain some minimum flow of ACKs in the US channel to the source in order to avoid a "stretch ACK" and burstiness at the source. That is, if few ACKs acknowledging large numbers of packets are sent to the source, the source ends up sending large amounts of packets in the DS direction at once rather than sending a more even flow of packets in the DS direction. As will be described with reference to FIG. 4, step 208 is carried out by maintaining a "drop count" for each queued packet. If the ACK currently under inspection has been dropped too many times, it is retained in the queue, and the method moves on to inspect the next packet in the queue (step 222).

If the queued packet is a potentially replaceable ACK and has not been dropped too many times, in step 210, it is determined whether the queued ACK is in the same session as the new ACK. A new ACK may only replace a queued ACK for the same TCP session. FIG. 4 sets forth the details for making this determination. If the queued ACK is in a different TCP session, it is left in the queue and the next packet in the queue is inspected (step 222).

Moving to step 212, it has now been determined that the ACK packet currently being inspected is potentially replaceable, has not already been dropped too many times and is in the same TCP session as the new ACK packet. Step 212 asks whether the new ACK has a higher ACK number than the queued ACK. That is, it asks whether the sequence number in the ACK field of the new ACK is higher than the sequence number in the ACK field of the queued ACK. If the new ACK has a higher ACK number than the queued ACK, it renders the queued ACK redundant and the queued ACK can be safely replaced by the new ACK or dropped altogether. A new ACK with an ACK number of "13", for example, would indicate that all bytes in the sequence up to and including byte "12" have been received. Hence, if the ACK under inspection had an ACK number of "7", that ACK is rendered redundant by the new ACK and can be replaced or dropped.

If the new ACK does not have a higher ACK number than the queued ACK, then it is a duplicate ACK and cannot be dropped or replaced yet. In this event, the new ACK is added to the tail of the queue (step 220). As previously discussed, when data packets arrive out-of-order, the receiver issues a duplicate ACK. After the source receives a particular number of duplicate ACKs, it will assume that the data packet indicated in the ACK was lost and retransmits it. Thus, until the next packet is received and a new ACK with a higher ACK number is generated by the receiver, the duplicate ACKs must be left in the queue because they convey important information (the next packet has not yet arrived) to the source.

Moving to step 214, we have now determined that a queued packet is in fact a replaceable ACK packet because it has not been dropped or replaced too many times already, it is in the same TCP session as the new ACK packet, and it has a lower ACK number than the new ACK packet. Step 214 asks whether an ACK has already been replaced during the current inspection or sweep of the queue with the new ACK. If there has not yet been a replacement, then the queued ACK is replaced with the new ACK (step 214), and the method moves on to inspect the next queued packet (step 222). If the new ACK has already been used to replace a queued ACK, then the current ACK under inspection no longer serves a purpose and may be removed from the queue altogether (step 218).

Referring now to FIG. 4, a specific implementation of method 200 will now be described. Steps 250-261 correspond to step 202 of FIG. 3: new packets arriving for US transmission are evaluated and characterized to determine whether they are potential replacement ACKs. In step 250, a new frame arrives for US transmission. If the frame carries an IP packet (step 251), it is evaluated further. If it does not, the packet cannot be a TCP ACK packet. In accordance with the present invention, each packet is linked to a variable PcktTy indicating its packet type. PcktTy may be "Ack", indicating that it can be replaced with another ACK packet or even dropped from the queue at some point; or "Other", indicating that the packet cannot be replaced or dropped from the queue. If, in step 251, we determine that the frame does not even carry an IP packet, PcktTy for that frame is designated "Other" (step 261) and it is placed in the queue (step 295). When the queued packet is later inspected in accordance with method 200, the designation "Other" will serve to indicate that the packet must be left in the queue for US transmission and not dropped or replaced.

Step 252 asks whether the new packet is a TCP packet, and is carried out by looking at the IP protocol field in the IP header. If the packet is not a TCP packet, the packet type is designated "Other" (step 261) and the packet is queued (step 295). If the packet is a TCP packet, step 253 asks whether it is a "simple" IP packet. A simple IP packet is one that has no options and, in one implementation, is identified by an IHL field having a value of 5 in the IP header. If the packet is not a simple IP packet (i.e., the IHL field in the IP header has a value greater than 5), the packet type is designated "Other" (step 261) and the packet is queued (step 295). If the packet is a simple IP packet, step 254 asks whether it is a TCP control packet. In one implementation, a bitwise AND operation performed on the TCP header "Data Offset", "Reserved", and "Flags" fields where 0x0007 evaluates to true indicates that the packet is a TCP control packet ($TCP_{DataOff+Reserv+Flags}$&&0x0007=True). In this regard, it should be noted that the designation $TCP_{DataOff}$ refers to the "Data Offset" field of the TCP header. Hence, the designation $TCP_{Reserv}$ refers to the "Reserved" field of the TCP header, and so on. If the packet is a TCP control packet, it cannot be dropped from the queue and is designated "Other" and queued.

If the packet is not a TCP control packet, step 255 asks the crucial question: whether it is a TCP ACK packet. In accordance with the present invention, only TCP ACK packets may be dropped from or replaced in the queue. In one implementation, a bitwise AND operation performed on the TCP header "Data Offset", "Reserved", and "Flags" fields where 0x0010 evaluates to true indicates that the packet is a TCP ACK packet ($TCP_{DataOff+Reserv+Flags}$&&0x0010=True). If the packet is not a TCP ACK packet, it is designated as type "Other" (step 261) and queued (step 295). If the packet is a TCP ACK packet, we now know that it is at least a candidate for replacing other TCP ACK packets and it is not added to the queue for now. It should be noted that, in some implementations, steps 251-255 may be carried out as a single step that asks whether the packet is a TCP ACK packet.

Some TCP ACK packets may be used to replace other ACK packets, but cannot be dropped themselves. In other words, such packets are suitable replacement ACKs, but are not replaceable ACKs. In particular, ACK packets carrying data in the reverse direction, having certain option settings, with explicit congestion notification (ECN) or with control flags set in the TCP header must not be dropped. Steps 256-260 perform this evaluation and characterization.

Step 256 asks whether the packet is a "plain" TCP ACK packet. A plain ACK packet is one that contains no data to be carried in the reverse (US) direction. In one implementation, if $[IP_{TotLength}-4XIP_{IHL}-4XTCP_{DataOffSet}]=0$, the packet is a plain ACK packet. If the packet is not a plain ACK packet (i.e., it carries data), it can be used to replace another ACK packet but it can not be dropped itself, so its packet type is designated "Other".

Step 257 looks at the "Options" field of the ACK packet TCP header. Certain options carry important information and must be included in the US transmission. Packets containing these options must be designated "Other" so they are not dropped. Other option settings may be safely dropped. The inventor has determined, in particular, that packets having the timestamp option (kind=8) and/or selective ACK (SACK) option (kind=5) may be safely discarded without appreciably diminishing system performance. That is, the virtual increase in US capacity and consequent increase in DS capacity utilization offsets any negative impact from the loss of the information contained in dropped ACKs having timestamp and/or SACK options.

The timestamp option (kind=8) gives the sender an accurate RTT measurement for every ACK packet, which in a sensible receiver corresponds to every other data packet. Therefore, the dropping of ACK packets in general clearly reduces the sampling frequency for the path-RTT estimation when the timestamp option is used. In addition, when dropping ACK packets that carry a timestamp option, the RTT computation yields shorter estimations because ACK packets echoing earlier timestamp values, and that waited longer to be transmitted, are dropped. The inventor has determined that the reduction in the sampling frequency for the RTT estimation is a more negative side effect of ACK-filtering than the impact on the variance in the RTT estimation. Accordingly, the present invention simply allows ACKs having timestamp options to be dropped. While special processing could be provided for handling timestamp options, such as keeping the oldest timestamp across ACK-drops, this is not preferred since it would increase complexity and add processing delay.

The SACK option (kind=5) provides the TCP source with more qualified acknowledgement information, allowing the receiver to indicate to the sender the successful receipt of non-contiguous (out-of-order) packets, hence SACK is present on duplicate ACKs. The method of the present invention drops duplicate ACKs only when the ACK number of a new ACK is higher than the ACK number of older packets in the queue. Thus, the new ACK may be closing some of the holes (sequence number gaps) reported in the SACK blocks of previous ACK packets. Therefore, a new ACK packet with an ACK number bigger than the ACK number on the queued ACK packet can always replace the older queued ACK packets. Since the new ACK advances the sender window and possibly closes holes in SACK blocks, there is little loss of information when the dropped ACK packets carried a SACK option.

In addition to the timestamp (kind=8) and SACK (kind=5) options, the "End of Options List" (kind=0) and the "No Operation" (kind=1) options can also be safely discarded if present on a TCP ACK packet. So, in step 257, the TCP options are "OK" (i.e. the packet may be dropped) if $TCP_{DataOffSet}$=5 (no options) or if $TCP_{DataOffSet}$>5 and only option kinds 0, 1, 5 or 8 are present. If other option kinds are present, the packet may be used as a replacement packet for other ACKs, but it must not be dropped itself and is designated as type "Other" (step 259).

Finally, step 258 asks whether the packet is marked with explicit congestion notification (ECN). In one implementation, a bitwise AND operation performed on the TCP header "Data Offset", "Reserved", and "Flags" fields where 0x00C0 evaluates to true indicates that the packet is a ECN-marked packet ($TCP_{DataOff+Reserv+Flags}$&&0x00C0=True). If the packet is ECN-marked it must not be dropped and is designated "Other". If an ACK packet is plain (step 256), has OK options (step 257) and is not ECN-marked, it is designated as type "Ack" in step 260. Such an ACK packet may both replace other ACK packets and be dropped or replaced itself.

Now that a new packet has been identified as a TCP ACK packet, and has been characterized as "Other" (do not drop) or "Ack" (droppable), the packets currently in the queue may be inspected and compared to the new packet to determine whether they may be replaced by the new packet or dropped. Steps 265-268 begin the process of inspecting the queue. First, in step 265, the "Replaced" flag is set to false to indicate that no packets in the queue have been replaced. As the method proceeds, when a packet in the queue is replaced, the "Replaced" flag will be changed to true. FIG. 2 illustrates a replace flag 160 associated with queue 150 that may be set to N or Y to signal whether any of packets 151-158 in queue 150 have yet been replaced by the new packet 159 under consideration.

Step 266 begins the inspection process at the head of the queue (step 266). Step 267 obtains the next packet in the queue for inspection. As shown in FIG. 2, step 267 may be thought of as sequentially moving a pointer "NEXT" through queue 150 from head 151 to tail 158 to obtain the next queued packet for inspection. Hence, the queued packet currently being inspected is designated "Next"; the new packet currently being considered (i.e. packet 159 of FIG. 2) is designated "Pckt".

Step 268 asks whether there is no next packet (i.e. NEXT=NULL). This occurs when the inspection process has moved through the entire queue and no packets remain to be inspected. So long as packets remain to be inspected, the method moves on to step 270. When the entire queue has been inspected, however, if any packets were replaced during the just-finished inspection of the queue (step 290), the method simply terminates (step 299) and awaits the arrival of the next US frame when it will begin anew. If no packets were replaced, the new packet is assigned a drop count ("DropCnt") set to zero (step 292), the new packet is queued (step 295) and the method terminates (step 299) and await arrival of a new frame for US transmission.

Step 270 considers the packet type (PcktTy) of the "Next" packet, or the queued packet currently under inspection. A packet type is "Ack" indicates that the Next packet is an ACK packet and may also be dropped. In this case, the method moves on to step 272 for further analysis of the Next packet. If the packet type is not "Ack" (i.e., if it is "Other"), the Next packet may not be dropped so the inspection process skips over it and moves on to step 267 to inspect the next packet in the queue. Step 270 corresponds to step 206 of FIG. 3, which asks whether the next queued packet is a potentially replaceable packet.

Step 272, corresponding to step 208 of FIG. 3, determines whether the queued packet currently being inspected has been dropped too many times by considering its drop count (DropCnt). As previously discussed, the method is careful not to drop a packet to many times in order to avoid stretch ACKs and burstiness at the source. Accordingly, step 272 compares the drop count of the currently queued (next) packet to a predetermined maximum drop count (a drop threshold) D. If Next.DropCnt>=D, then the packet has been dropped its maximum number of times and should be left in the queue for US transmission. In this event, the packet is skipped over (left in the queue) and the method proceeds to step 267 to consider the next queued packet.

Steps 275-277 correspond to step 210 of FIG. 3 and determine whether the queued ACK is part of the same TCP session as the new ACK. Step 275 compares the IP destination address field of the new packet with the IP destination address field of the currently queued packet, or asks whether Pckt($IP_{DstAdd}$)=Next($IP_{DstAdd}$). Step 276 compares the TCP source and destination ports of the new packet with the TCP source and destination ports of the currently queued packet, or asks whether Pckt($TCP_{SDPort}$)=Next($TCP_{SDPort}$). Step 277 compares the IP source address field of the new packet with the IP source address field of the currently queued packet, or asks whether Pckt($IP_{SrcAdd}$)=Next($IP_{SrcAdd}$). If any of these tests fail, the new and queued ACKs are not part of the same session and the method moves on to the next queued ACK in step 267. Otherwise, it is confirmed that the new and queued ACKs are part of the same session and the method moves onto step 280.

In step 280, it has now been determined that the queued ACK packet currently being inspected is replaceable (Next.PcktTy=Ack), has not been dropped too many times (Next.DropCnt<D) and is in the same TCP session as the new ACK packet. Step 280 asks whether the new ACK has a higher ACK number than the next ACK, or Pckt($TCP_{Ack}$)>Next($TCP_{Ack}$)?. That is, it asks whether the sequence number of the new ACK is higher than the sequence number of the queued ACK. If the new ACK has a higher ACK or sequence number than the queued ACK, it renders the queued ACK redundant and the queued ACK can be safely replaced by the new ACK or dropped altogether.

If the new ACK does not have a higher ACK number than the queued ACK, then it is a duplicate ACK and cannot be dropped or replaced yet. In this event, the method proceeds to step 290, the new packet is assigned a drop count set to zero (step 292) and the new packet is added to the tail of the queue (step 295). As previously discussed, when data packets arrive out-of-order, the receiver issues a duplicate ACK. After the source receives a particular number of duplicate ACKs, it will assume that the next data packet in the sequence was lost and retransmits it. Thus, until the next packet is received and a new ACK with a higher ACK number is generated by the receiver, the duplicate ACKs must be left in the queue because they convey important information (the next packet has not yet arrived) to the source.

If the queued ACK does have a lower ACK number than the new ACK packet, it can safely be replaced or discarded. Step 282 asks whether an ACK has already been replaced during the current inspection of the queue with the new ACK by looking at the status of the "Replace" flag. If the "Replace" flag is false, indicating that there has not yet been a replacement, then the queued ACK is replaced with the new ACK (step 283), and the packet type is set to match the packet type of the new ACK (step 284). The drop count of the packet is increased by one (step 285) and the "Replace" flag is set to true (step 286) to reflect the replacement that has just occurred. The method moves on to step 267 to inspect the next queued packet.

If step 282 reveals that the new ACK has already been used to replace a queued ACK ("Replace"=True), then the current ACK under inspection is a duplicate ACK with dated loss information and it no longer serves a purpose since the new ACK information (higher ACK number) has already been inserted into the queue. In this case, the queued ACK is removed from the queue altogether (step 287). The method then moves on to step 267 to inspect the next queued packet.

The ACK discarding described in this invention is intended to improve performance for DS TCP transfers. However, performance degradation is also possible due to congestion state in source-destination path. For this reason, the drop threshold D in 272 of FIG. 4 is a configurable parameter that the manager of the device implementing this invention can set. A recommended value of two (2) for the configurable drop threshold D represents a balance between performance gains and capping the source burstness. Larger values can possibly yield higher performance improvements at increased source burstness and the risk of data packet losses over congested paths. Setting this parameter to one only yield modest performance gains but could be used during peak usage times.

While various embodiments of the invention have been described, it will be apparent to those of ordinary skill in the art that many more embodiments and implementations are possible that are within the scope of this invention.

What is claimed is:

1. A method for transmission control protocol (TCP) acceleration, comprising:
   receiving an incoming acknowledgement packet belonging to a TCP session;
   searching an upstream queue for queued acknowledgment packets belonging to the same TCP session; and replacing one of the queued acknowledgment packets with the incoming acknowledgment packet in the position in the upstream queue occupied by the oldest of the queued acknowledgment packets if the incoming acknowledgment packet is not a duplicate of the queued acknowledgment packet, wherein the oldest queued acknowledgment packet is replaced only if a drop count of the oldest queued acknowledgment packet has not yet exceeded a configurable drop threshold value.

2. A method as claimed in claim 1, wherein replacing the oldest queued acknowledgment packet with the incoming acknowledgment packet occurs when the acknowledgment number field of the incoming acknowledgment packet is greater than the acknowledgment number field of the oldest queued acknowledgment packet.

3. A method as claimed in claim 1, and further comprising:

dropping any remaining queued acknowledgment packets in the upstream queue after the oldest queued acknowledgement packet has been replaced by the incoming acknowledgement packet.

4. A method as claimed in claim 1, wherein queued acknowledgment packets that are explicit congestion notification (ECN) marked packets are not considered for dropping.

5. A method as claimed in claim 1, wherein queued acknowledgment packets that are selective acknowledgment (SACK) packets are considered for dropping only when the incoming acknowledgment packet is not a duplicate of the queued SACK.

6. A system for transmission control protocol (TCP) acceleration, comprising:

an upstream queue for queuing packets, including TCP acknowledgment packets;

means for receiving an incoming acknowledgement packet belonging to a TCP session;

means for searching an upstream queue for queued acknowledgment packets belonging to the same TCP session;

means for replacing one of the queued acknowledgment packets with the incoming acknowledgment packet in the position in the upstream queue occupied by the oldest of the queued acknowledgment packets if the incoming acknowledgment packet is not a duplicate of the queued acknowledgment packet; and means for dropping the oldest queued acknowledgment packet in the upstream queue as long as a drop count of the oldest queued acknowledgment packet does not exceed a configurable drop threshold value.

7. A system as claimed in claim 6, wherein replacing the oldest queued acknowledgment packet with the incoming acknowledgment packet occurs when the acknowledgment number field of the incoming acknowledgment packet is greater than the acknowledgment number field of the oldest queued acknowledgment packet.

8. A system as claimed in claim 6, further comprising means for dropping the remaining queued acknowledgment packets in the upstream queue following the replacement of the oldest queued packet with the incoming acknowledgment packet.

9. A system as claimed in claim 6, wherein queued acknowledgment packets that are explicit congestion notification (ECN) marked packets are not considered for dropping.

10. A system as claimed in claim 6, wherein queued acknowledgment packets that are selective acknowledgment (SACK) packet are considered for dropping only when the incoming acknowledgment packet is not a duplicate of the queued SACK.

* * * * *